Aug. 11, 1931.   W. A. TOLSON   1,818,963
SPEED CONTROL APPARATUS
Filed Oct. 7, 1930
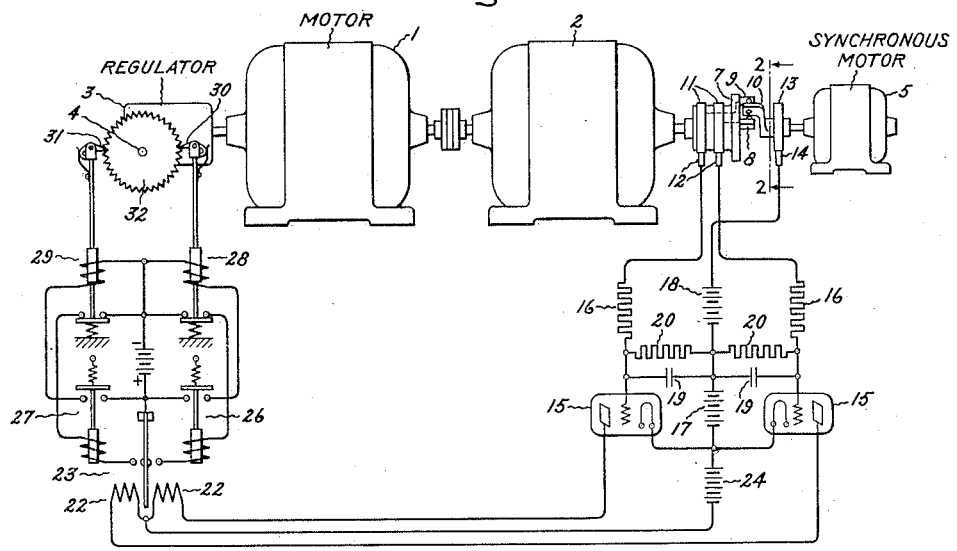
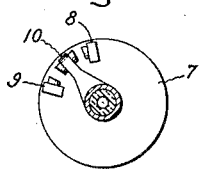
Inventor:
William A. Tolson,
by Charles E. Tullar
His Attorney.

Patented Aug. 11, 1931

1,818,963

UNITED STATES PATENT OFFICE

WILLIAM A. TOLSON, OF ERLTON, NEW JERSEY, ASSIGNOR TO GENERAL ELECTRIC COMPANY, A CORPORATION OF NEW YORK

SPEED CONTROL APPARATUS

Application filed October 7, 1930. Serial No. 487,037.

My invention relates to apparatus for the control of the speed of a power motor in accordance with the speed of a reference motor. With apparatus heretofore employed, I have found that in cases where the reference motor is subject to rapidly recurring speed variations, such for example as the hunting of a synchronous motor incident to sudden fluctuations in the A. C. supply, the control apparatus tends to produce corresponding speed variations in the power motor although the average speed of the two motors is the same.

It is the object of my invention to provide an improved apparatus of this character wherein such rapidly recurring speed variations of the reference motor are ineffective to produce corresponding changes in the power motor.

My invention will be better understood from the following description taken in connection with the accompanying drawings, and its scope will be pointed out in the appended claims.

Referring to the drawings, Fig. 1 represents an embodiment of my invention; and Fig. 2 shows a cross section thereof taken on line 2—2 of Fig. 1.

In the drawings I have shown the power motor 1 direct connected with the generator 2, which for example may be constructed to produce a 500 cycle alternating current adapted for use in picture transmission. The motor 1 is provided with the speed regulator 3 of any suitable form which regulator has the shaft 4 by which the setting of the regulator may be changed to increase or decrease the regulated speed of the motor. At 5 I have shown the speed reference motor which in the present case is a synchronous motor having its shaft arranged in alignment with the shaft of generator 2. Mounted on the generator shaft is the contact disc 7 (shown enlarged in Fig. 2) which disc has the two contact members 8 and 9. Between these two contact members is the contact member 10 which is carried by the shaft of the synchronous motor 5. Suitable connections are made to the contact members 8 and 9 through slip rings 11 and brushes 12, and similarly a connection is made to the contact member 10 through a slip ring 13 and a brush 14. Two thermionic devices 15 each have their grids connected with the respective brushes 12 through resistances 16 and have their filaments connected to the brush 14 through the normal bias battery 17 and the control bias battery 18. Each grid also connects with the conductor joining the two batteries through the condensers 19 each of which is shunted by a resistance 20. By means of this arrangement the thermionic devices are caused to make a delayed response to the operation of the contacts, the values of the resistances 16 and 20 and the capacitance of the condenser 19 being proportioned to give the desired delay in the response. The plate circuits of the two thermionic devices 15 connect respectively with the two windings 22 of the differential relay 23 the filaments being connected through the plate battery 24 with the common terminal of the windings 22. Relays 26 and 27 respectively are actuated in response to the opposite movements of the armature of relay 23 to cause the energization of the respective notching relays 28 and 29. These notching relays are provided with pawls 30 and 31 which engage a tooth wheel 32 on shaft 4 of the regulator. By this arrangement of relays, as long as relay 23 is energized by one or the other of its windings the corresponding notching relay 28 or 29 continues to vibrate to rotate the shaft of the regulator in one direction or the other. The notching relays are preferably made to operate sufficiently slow so that the motor is able to respond to each change in adjustment or setting of the regulator before the next change is made.

In operation, as long as the speed of the power motor equals that of the reference motor the contact 10 will not engage either of the contacts 8 and 9. If the power motor gains or loses in speed the contact 10 will engage one or the other of the contacts 8 and 9 and through the thermionic devices and the relay 23 together with the notching relays will rotate the shaft of the regulator to change the setting thereof in such a manner as to produce the desired correction in the power motor speed. In the event that rapidly recurring changes occur in the speed of the reference motor 5, such for example as hunting due to sudden fluctuations in the alternating current supply thereof, the contact 10 will alternately engage contacts 8 and 9 although the average speed of the reference motor may be equal to that of the power motor. Under such circumstances the time delay means provided in the grid circuits of the thermionic devices cause both windings of the relay 23 to be energized equal amounts. Hence the armature of the relay remains in its midposition and the notching relays are not energized. If, however, any change in speed of the reference motor occurs during the hunting of the motor, the resulting differential current through relay 23 will serve to cause the operation of the appropriate notching relay to effect the desired operation of the regulator.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. In combination, a power motor, a speed-reference motor subject to rapidly recurring speed variations, cooperating contacts controlled respectively by the power motor and the reference motor, and means responsive to the operation of said contacts for controlling the speed of the power motor, said means including time delay means whereby the power motor is rendered non-responsive to said speed variations of the reference motor.

2. In combination, a power motor having a speed regulating device, a speed-reference motor subject to rapidly recurring speed variations, cooperating contacts controlled respectively by the power motor and the reference motor, and means responsive to the operation of said contacts for controlling said regulating device, said means including apparatus for producing a time delay in the response of the regulating device to the operation of the contacts.

3. In combination, a power motor, a speed-reference motor subject to rapidly recurring speed variations, cooperating contacts controlled respectively by the power motor and the reference motor, and means responsive to the operation of said contacts for controlling the speed of the power motor, said means including thermionic devices having grid circuits provided with time delay means.

4. In combination, a power motor having a speed regulating device, a speed-reference motor subject to speed variations due to hunting, cooperating contacts rotated respectively by the power motor and the reference motor, and means responsive to the operation of said contacts for varying the setting of said regulating device including a plurality of thermionic devices each having a grid circuit provided with time delay circuit, said thermionic devices being arranged to produce opposite changes respectively in the setting of the regulating device.

5. In combination, a power motor having a speed regulating device, a synchronous speed-reference motor, a plurality of circuits having cooperating contacts rotatable with said motors and arranged to close the circuits in response respectively to a relative increase or decrease in the speed of the reference motor, a thermionic device in each of said circuits having therein time delay means, and means controlled by said thermionic devices for producing opposite changes respectively in the setting of the regulating device.

In witness whereof, I have hereunto set my hand this second day of October, 1930.

WILLIAM A. TOLSON.